(12) United States Patent
Lipscomb et al.

(10) Patent No.: US 8,381,685 B2
(45) Date of Patent: Feb. 26, 2013

(54) PET FOUNTAIN

(75) Inventors: John M. Lipscomb, Cedarburg, WI (US); Stanley L. Suring, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 12/474,460

(22) Filed: May 29, 2009

(65) Prior Publication Data

US 2010/0300366 A1 Dec. 2, 2010

(51) Int. Cl.
*A01K 7/00* (2006.01)

(52) U.S. Cl. ......................................... 119/74

(58) Field of Classification Search .............. 119/74, 119/72, 51.5, 61.5; 239/16, 17; 174/50, 174/66, 67, 480, 152 R, 153 G, 488
See application file for complete search history.

(56) References Cited

U.S. PATENT DOCUMENTS

| | | | |
|---|---|---|---|
| 2,573,802 A | 11/1951 | Mitchel | |
| 3,720,184 A | 3/1973 | Pearce | |
| 4,329,940 A | 5/1982 | Humphries | |
| 4,573,434 A | 3/1986 | Gardner | |
| 4,840,143 A | 6/1989 | Simon | |
| 4,860,691 A * | 8/1989 | Mayer | 119/51.5 |
| 5,105,768 A | 4/1992 | Johnson | |
| 5,195,462 A | 3/1993 | Gustin | |
| 5,207,182 A | 5/1993 | Lorenzana | |
| 5,259,336 A | 11/1993 | Clark | |
| D365,668 S | 12/1995 | Lorenzana et al. | |
| 5,488,927 A | 2/1996 | Lorenzana et al. | |
| 5,501,178 A * | 3/1996 | Kemp | 119/74 |
| D374,516 S | 10/1996 | Lillelund et al. | |
| 5,730,082 A | 3/1998 | Newman | |
| 5,738,038 A | 4/1998 | Barton | |
| 5,738,039 A | 4/1998 | Berman et al. | |
| 5,799,609 A | 9/1998 | Burns et al. | |
| 5,845,600 A | 12/1998 | Mendes | |
| 5,960,741 A | 10/1999 | Ballen et al. | |

(Continued)

FOREIGN PATENT DOCUMENTS

| | | |
|---|---|---|
| JP | 6-81247 | 11/1994 |
| JP | 3-069117 | 3/2000 |

OTHER PUBLICATIONS

"Pet Fountain Instruction Guide", Lentek International, Inc., P.O. Box 593812, Orlando, FL 32859-3812, 2 pages, undated.

*Primary Examiner* — Rob Swiatek
*Assistant Examiner* — Lisa Tsang
(74) *Attorney, Agent, or Firm* — Boyle Fredrickson, S.C.

(57) ABSTRACT

A pet fountain having a housing of snap together construction formed of a base and cover. The base includes a basin in which an integrally formed filter-holding divider is disposed that separates the basin into a return sump and pumping chamber. The cover includes a water holding bowl, an inlet and a drain overlying the return sump that encloses a pump that provides fluid to the bowl via inlet when attached to the base. The cover includes a downwardly extending tube that fluidly registers with a discharge of the pump when attached to the base. In a preferred embodiment, the cover has upper and lower bowls connected by a spillway that conveys overflow from the upper bowl to the lower bowl where it is return via drain to the return sump. The cover can be configured to mate with the housing to enclose the entire basin, pump, and filter.

28 Claims, 11 Drawing Sheets

U.S. PATENT DOCUMENTS

| | | | |
|---|---|---|---|
| 5,960,742 A | 10/1999 | O'Rourke et al. | |
| 6,055,934 A | 5/2000 | Burns et al. | |
| 6,079,361 A | 6/2000 | Bowell et al. | |
| D428,217 S | 7/2000 | Rodack et al. | |
| 6,101,977 A | 8/2000 | Matz | |
| 6,119,628 A | 9/2000 | Lorenzana et al. | |
| 6,119,629 A | 9/2000 | Sicchio | |
| 6,253,709 B1 | 7/2001 | King | |
| 6,257,288 B1 | 7/2001 | Davidian et al. | |
| D456,569 S | 4/2002 | Northrop | |
| D457,692 S | 5/2002 | Skurdalsvold et al. | |
| 6,460,483 B1 | 10/2002 | Northrop et al. | |
| 6,463,880 B1 | 10/2002 | Callingham | |
| 6,467,428 B1 | 10/2002 | Andrisin et al. | |
| 6,622,657 B2 | 9/2003 | Northrop et al. | |
| 6,684,813 B1 * | 2/2004 | Lemon | 119/69.5 |
| 6,718,911 B2 | 4/2004 | Greenberg | |
| 6,739,284 B1 | 5/2004 | Olive | |
| D497,041 S | 10/2004 | Plante | |
| 6,834,205 B2 | 12/2004 | Eberle et al. | |
| 6,863,025 B2 | 3/2005 | Ness | |
| 6,894,223 B1 * | 5/2005 | Shotey et al. | 174/67 |
| 6,928,954 B2 | 8/2005 | Krishnamurthy | |
| 6,971,331 B1 | 12/2005 | Rohrer | |
| D514,751 S | 2/2006 | Plante | |
| 7,040,249 B1 | 5/2006 | Mushen | |
| 7,089,881 B2 * | 8/2006 | Plante | 119/74 |
| 7,146,930 B1 | 12/2006 | Ness | |
| 7,538,272 B1 * | 5/2009 | Shotey et al. | 174/66 |
| 2005/0166853 A1 | 8/2005 | Plante | |
| 2006/0174838 A1* | 8/2006 | Plante | 119/74 |
| 2008/0230009 A1* | 9/2008 | Craig | 119/73 |

* cited by examiner

PET FOUNTAIN

FIELD

The present invention relates to a pet fountain, and more particularly, a pet fountain having a relatively simple construction that allows for continuous recirculation and filtering of water for a pet.

BACKGROUND

Pet fountains that create flowing water for attracting pets are well known. Exemplary pet fountains generally include a spout or other water directing means for providing a continuous flow of water from a reservoir to a container such that the pet is able to drink either directly from the flowing water stream or from the container. The container typically includes a drain for recirculating water stored therein to the reservoir for filtering and delivery to the spout or other water directing means. A pump is typically provided for drawing water from the container and into the reservoir through an inlet thereof. The pump also includes a discharge for pumping water received thereby to the spout. A filter is usually provided between the container and the pump for filtering water such that the water is filtered of animal hair and other such debris before being recirculated through the pet fountain for drinking.

There have been a number of commercially successful pet fountains. However, known pet fountains suffer from a number of disadvantages. As such, an improved pet fountain is desirable. Such pet fountains generally require a large number of pieces and thus require a great deal of time and effort to assemble. Further, manufacturing of such pet fountains is generally more difficult due to the large number of pieces thereby increasing the manufacturing cost associated with producing these pet fountains. These pet fountains are also difficult to clean and maintain because of the large number of parts. Accordingly, changing the filter and/or cleaning the pet fountain takes a great deal of effort.

Thus, an improved pet fountain that overcomes the disadvantages of these known pet fountains is desirable. For instance, it is desirable to provide a pet fountain that is relatively simple to manufacture and assemble and that comprises relatively few parts. Further, it is desirable to provide a pet fountain that is easy to clean and service. In addition, it is desirable to provide a pet fountain that is relatively inexpensive yet reliable.

SUMMARY

The present invention is directed to a pet fountain that is relatively easy to manufacture, assemble and maintain. The pet fountain has a housing, which defines an interior for holding water. The housing includes a base and a cover. The base is configured with a basin to hold water for use with the pet fountain, and the cover is configured to be releasably secured to the base to form a housing that can enclose the entire basin.

The cover includes an upper surface defining an upper bowl positioned rearwardly from a lower bowl. A spout is integrally provided within the upper bowl through a hole formed therein for continuously delivering a flow of water to the upper bowl. A sloped spillway extends between the upper bowl and the lower bowl such that when the upper bowl is filled with water above a certain level, overflowing water flows down the spillway into the lower bowl. The lower bowl includes a drain that can be an aperture formed in a sidewall of the bowl such that when the lower bowl is filled to a predetermined level, the water is drained therefrom through the aperture and into the basin.

The basin includes a return sump positioned beneath the lower bowl and in communication with the drain such that water flowing from the lower bowl through the drain is received in the return sump. A divider including a filter is provided between the return sump and a pumping chamber. The pumping chamber includes a submersible pump for drawing water from the return sump through the filter and into the pumping chamber such that the pump may discharge the filtered water through its discharge port through the spout and into the upper bowl. As such, water is continuously recirculated through the pet fountain of the present invention. The water is cleaned by the filter each time it is recirculated through the pet fountain thereby removing any debris, animal hair, or other contaminants therefrom.

In one preferred embodiment, the divider includes integrally formed divider wall segments that each has an integrally formed filter holding channel that receives one end of a filter such that the divider wall segments and filter define the divider. In another preferred embodiment, the divider is formed by a filter chamber having at least two pairs of filter holding channels that enable receipt of first-stage and second stage filters.

The cover and base are configured for releasable attachment to facilitate easy assembly, disassembly, filling and maintenance. The cover and base are configured with a plurality of spaced apart and opposed latching arrangements that are of snap-fit construction. In a preferred embodiment, each latch arrangement includes a snap carried by the cover or the base and a snap-engaging detent carried by the other one of the cover or base.

The cover and base define a housing that encloses the basin, pump and filter therein. One of the cover and base has a seat about its periphery that mate with a peripheral edge of the other one of the cover and base to enclose the basin, pump and filter. Such a seat can formed at least in part by an outwardly extending lip or skirt that extends about the outer periphery of the cover or base.

The base can also be configured with an integrally formed upraised cord conduit that receives an elastomeric cap with a cord-receiving channel and a cord inserting slot so as to provide a water tight seal therebetween while also providing cord strain relief. The base can also include an integrally formed pump seat that positions the pump so its discharge is in fluid-flow registry with an intake tube that extends downwardly from the cover when the cover is attached to the base.

A fountain constructed in accordance with the present invention advantageously has a minimum of parts, is easy to clean as it is dishwasher safe, and is easy to assemble, take apart, maintain, fill and clean. In addition, a fountain constructed in accordance with the invention has a minimum of parts that minimizes cost and assembly and which is simple, reliable and economical to operate.

Other advantages, benefits and features of the present invention will become apparent to those skilled in the art upon reading the detailed description and viewing the related drawings.

DRAWING DESCRIPTION

One or more preferred exemplary embodiments of the invention are illustrated in the accompanying drawings in which like reference numerals represent like parts throughout and in which.

Figure 1:
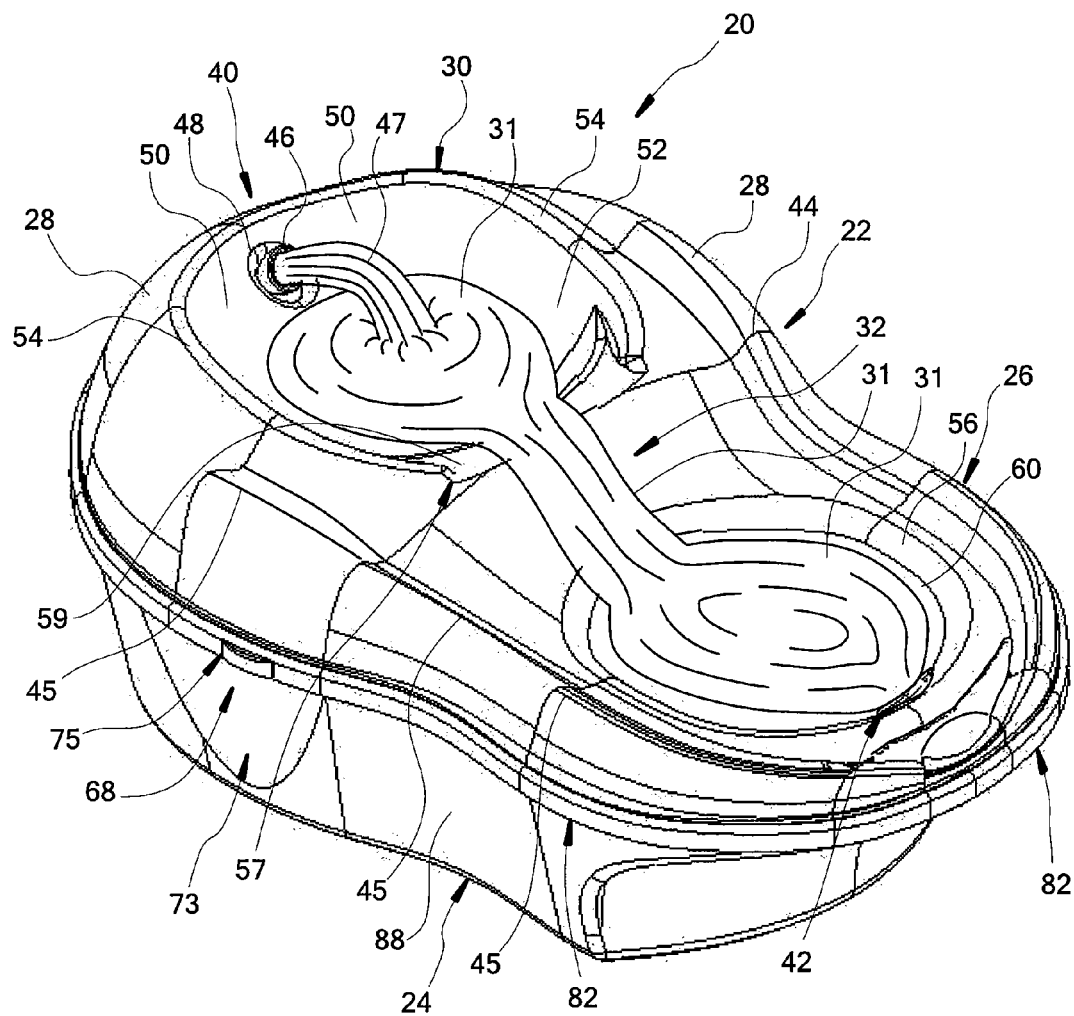
FIG. 1 is a perspective view of a first embodiment of a pet fountain according to the present invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 5:
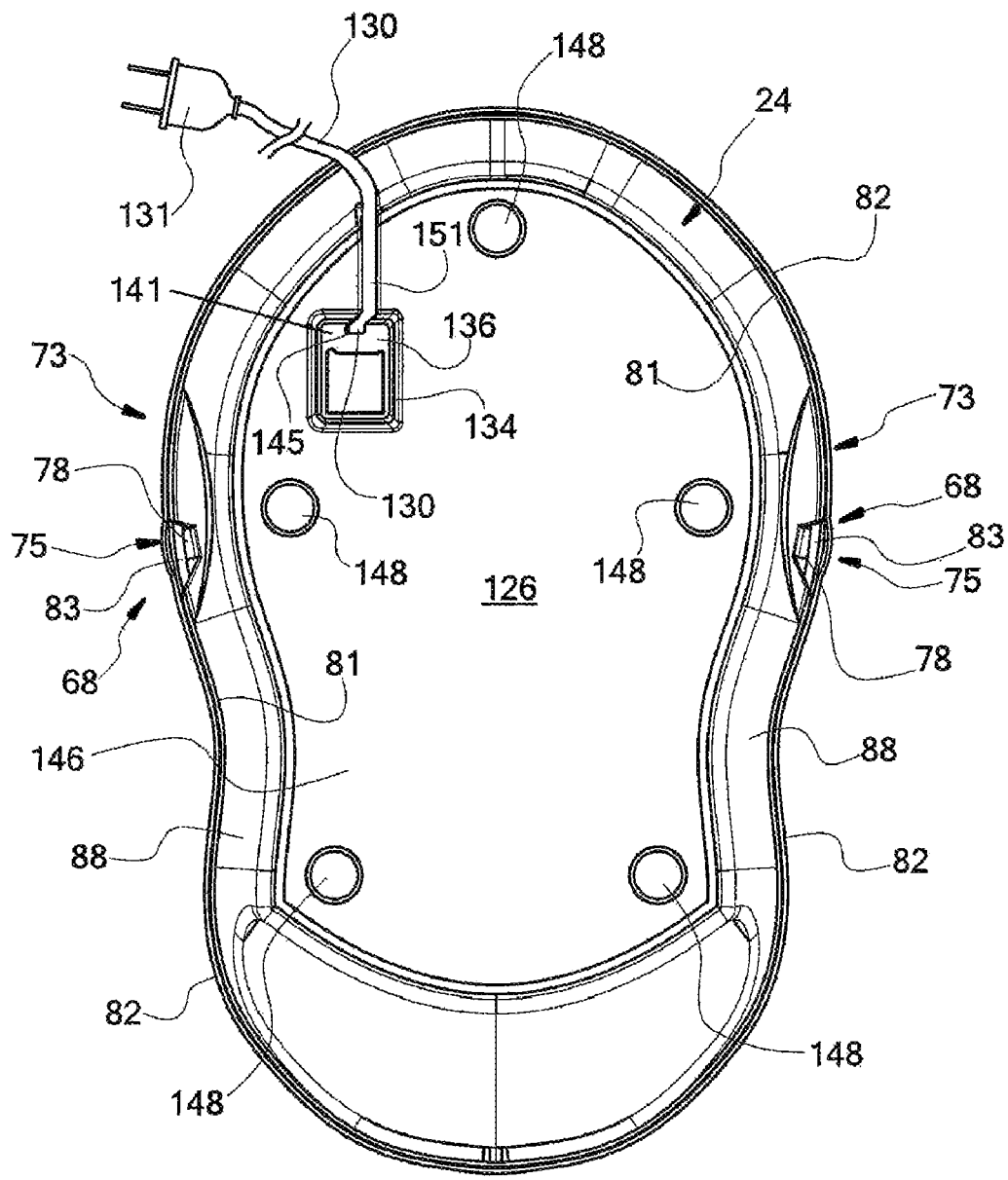
FIG. 5 is a bottom plan view of the pet fountain shown in FIGS. 1-4.
Figure 6:
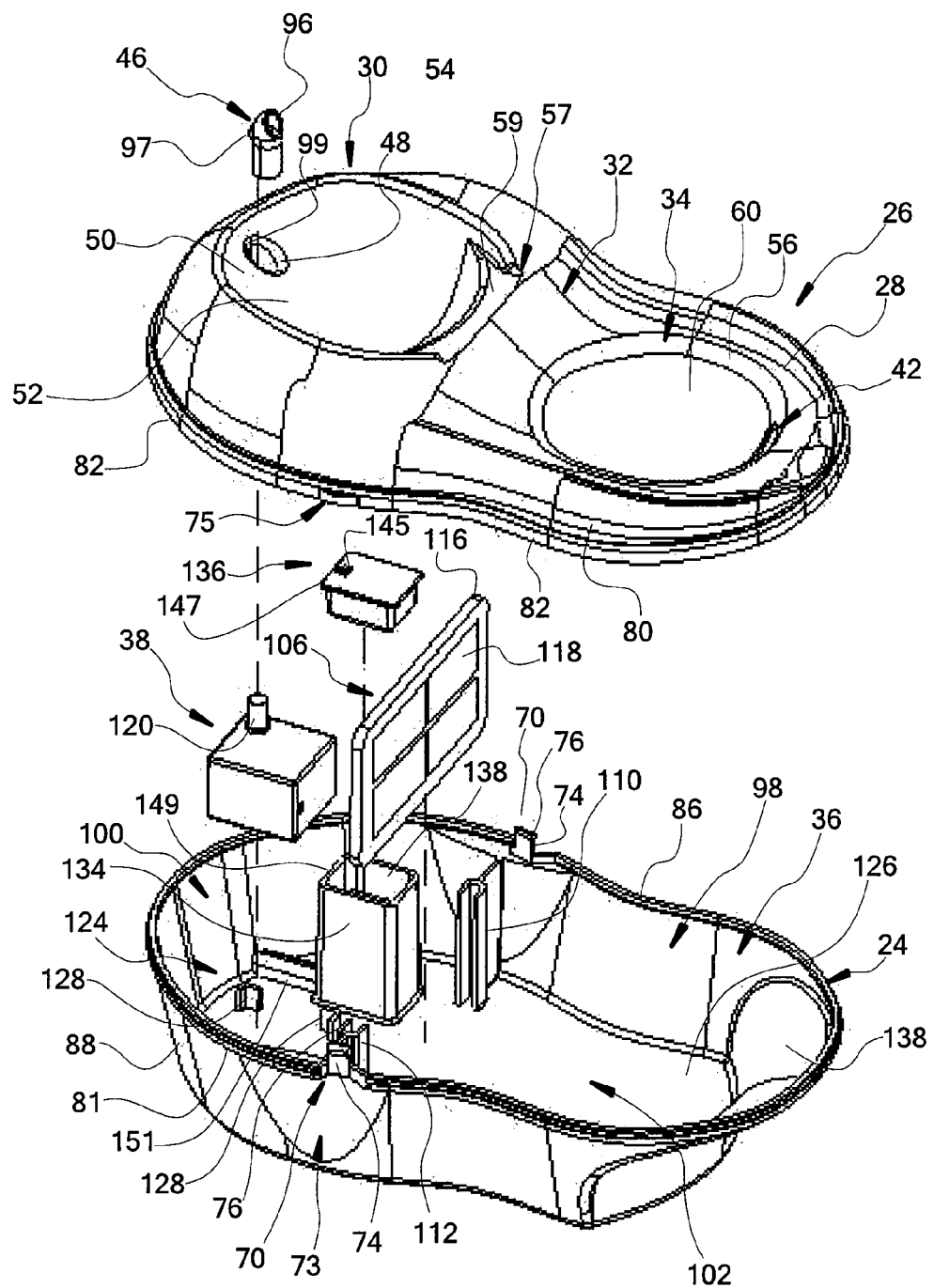
FIG. 6 is an exploded perspective view of the pet fountain according to the present invention.
Figure 7:
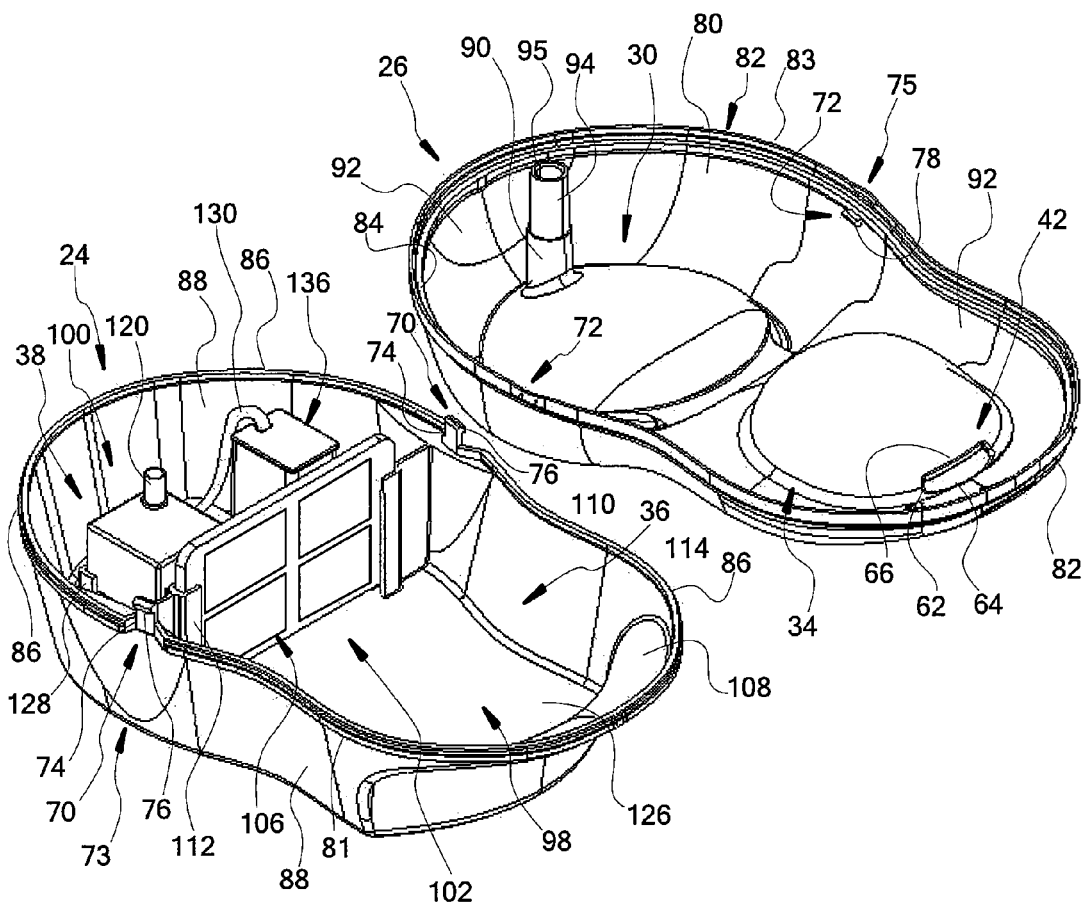
FIG. 7 is a perspective exploded view of the pet fountain showing an interior of a basin and a bottom portion of a cover.
Figure 8:
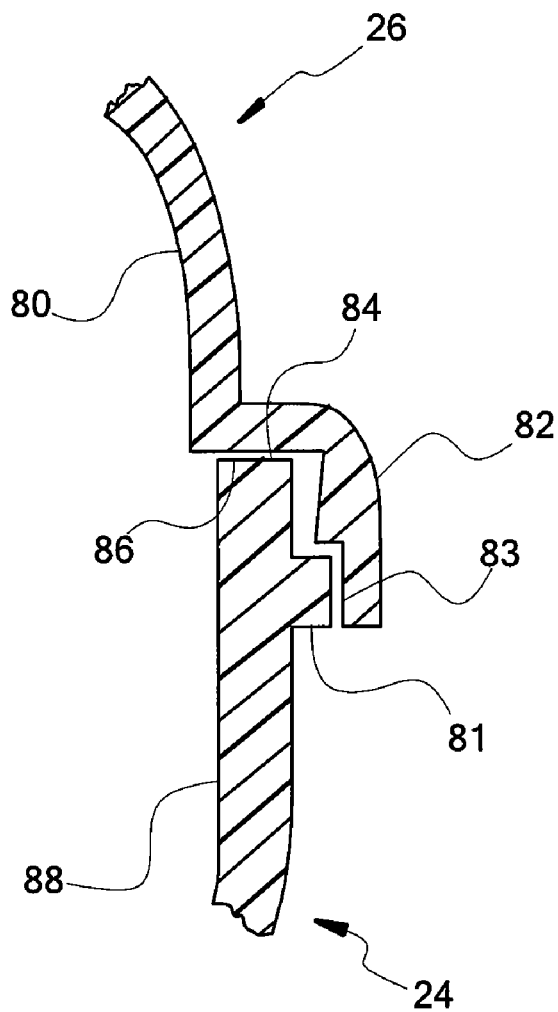
FIG. 8 is a fragmentary cross-sectional view of a portion of the fountain housing taken along line 8-8 of FIG. 2.
Figure 9:
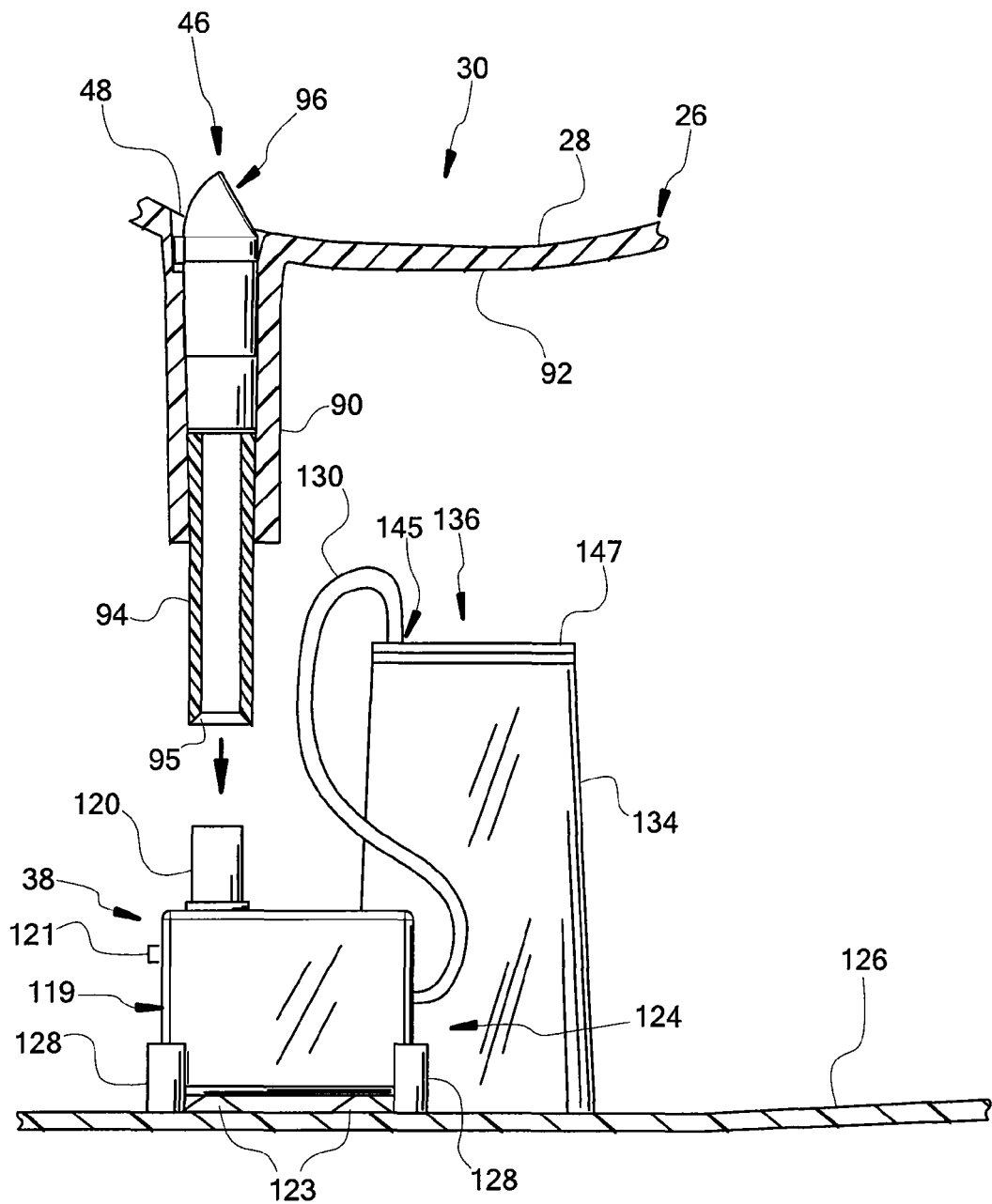
FIG. 9 is a fragmentary cross sectional view of a portion of the fountain housing depicting registry of an intake tube of the cover with a discharge port of the pump as the cover is being attached to the base.

Referring now to FIGS. 1-10, a first embodiment of a pet fountain 20 according to the present invention is illustrated. Pet fountain 20 includes a housing 22 having a base 24 and a cover 26 releasably secured to one another. Cover 26 has a contoured outer surface 28 with an upper pet drinking bowl 30 formed therein from which overflowing water 31 flows down a downwardly angled spillway 32 into a lower pet drinking bowl 34 located below the upper bowl 30. With reference to FIGS. 6-7 and 9, the base 24 includes an internal water-holding basin 36 that holds a supply of water that a pump 38 discharges through an inlet 40 in the cover 26 into upper bowl 30. After flowing down the spillway 32 into the lower bowl 34, water 31 flows through a drain 42 in the lower bowl 34 back into the basin 36 where it can be pumped back into the upper bowl 30, producing a pet fountain 20 of recirculating construction.

The outer surface 28 of the cover 26 also includes a pair of elongate upraised shoulders 44 and 45 that extend along opposite sides of the spillway 32 to help keep water flowing along the spillway 32 by preventing spillage. Each shoulder 44, 45 can have a portion that extends alongside the opposite sides of the upper bowl 30 and lower bowl 34 thereby also helping to funnel spilled water back into a respective one of the bowls 30, 34. Although not shown in the drawing figures, if desired, shoulders 44, 45 can converge along the front of the lower bowl 34 to help return water spilled from lower bowl 34 back into the bowl 34.

Upper bowl 30 is positioned rearward with respect to lower bowl 34 and at a level that is at least somewhat higher than the lower bowl 34 such that gravity causes water 31 in the upper bowl 30 to freely flow downwardly into the lower bowl 34 when the water level reaches the desired height in the upper bowl 30. Upper bowl 30 and lower bowl 34 are configured to retain water 31 therein for drinking by a pet, such as a cat or dog. The inlet 40 includes an upwardly extending discharge spout 46 that receives water from the pump 38 and discharges it as a free flowing stream 37 of water into upper bowl 30 helping to entice a pet to drink from fountain 20. Spout 46 is received in a hole 48 formed in the cover 26 that preferably is located in part of the upper bowl 30 opposite the spillway 32. In a preferred embodiment, the spout 46 received in the hole 48 in a manner that fixes it to the cover 26.

Spout 46 is disposed in an upraised and generally downwardly canted surface 50 of upper bowl 30 such that the stream 37 of water discharged therefrom can be generally arched to land in upper bowl 30 helping to attract attention of a pet while also reducing splashing. The upper bowl 30 is of concave construction defined by a sidewall 52 that is bounded by a top peripheral edge 54. The bowl sidewall 52 includes canted upper sidewall surface 50 that is generally located opposite the spillway 32 and borders a portion of the top edge 54 of the bowl 30 that is higher than that which borders the spillway 32.

As such, the upper bowl 30 can be tilted relative to a generally horizontal plane downwardly toward the spillway 32 so water filling the bowl 30 flows out and down the spillway 32 without overflowing any other portion of the bowl 30. To put it another way, the top peripheral edge 54 of the upper bowl 30 can be generally disposed along a plane that is angled downwardly at an acute angle relative to horizontal toward the spillway 32. The lower bowl 34 need not be so inclined or angled such that it can be oriented with its top peripheral edge 56 disposed along a generally horizontal plane.

In the preferred fountain embodiment shown in FIGS. 1-10, the top edge 54 of the upper bowl 30 provides an upraised rim 54 extending substantially about the entire periphery of the bowl 30. As is best shown in FIGS. 1-4, upper bowl 30 can be configured to include an integrally formed interruption 57 in the basin rim 54 that is in fluid flow cooperation with the spillway 32 that sets the water level in the upper bowl 30 while helping to ensure water flowing out of the bowl 30 efficiently flows onto the spillway 32. Where configured with such an interruption 57, it can include a flat portion 59 that extends rearwardly into the upper bowl 34.

Figure 2:
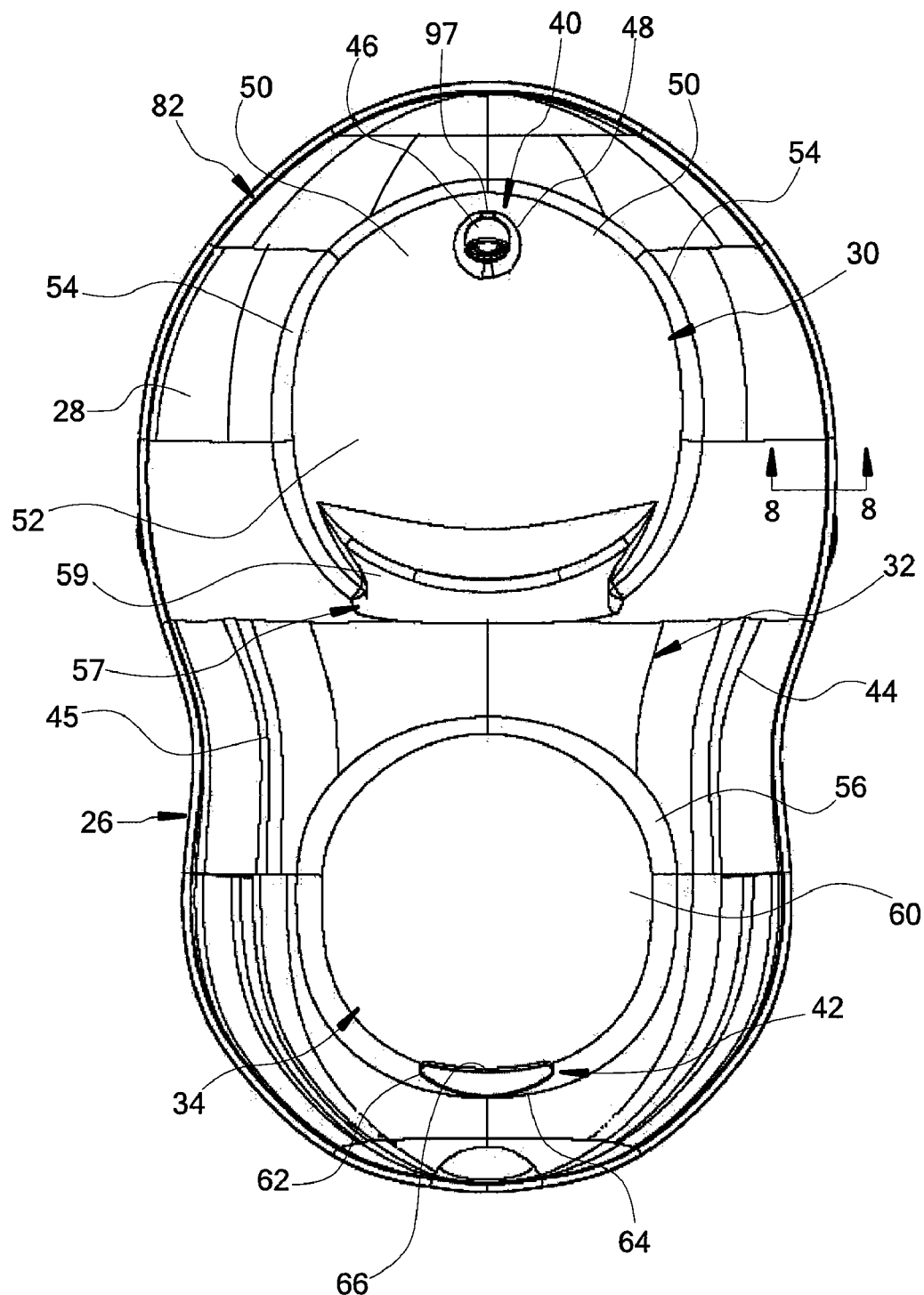
FIG. 2 is a top plan view of the pet fountain shown in FIG. 1.
Figure 3:
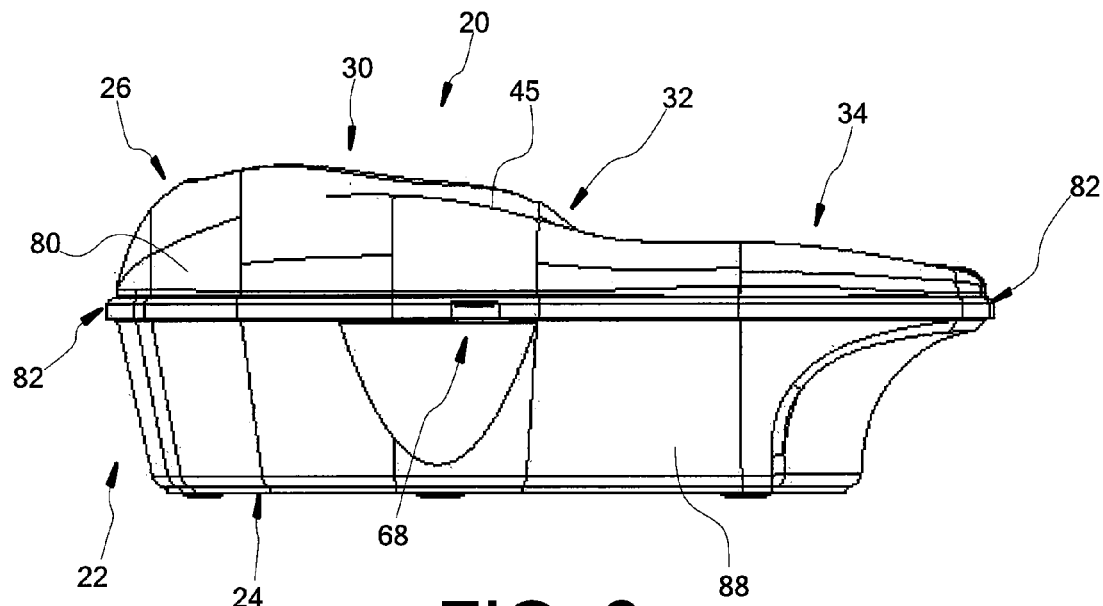
FIG. 3 is a side elevation view of the pet fountain shown in FIGS. 1 and 2.
Figure 4:
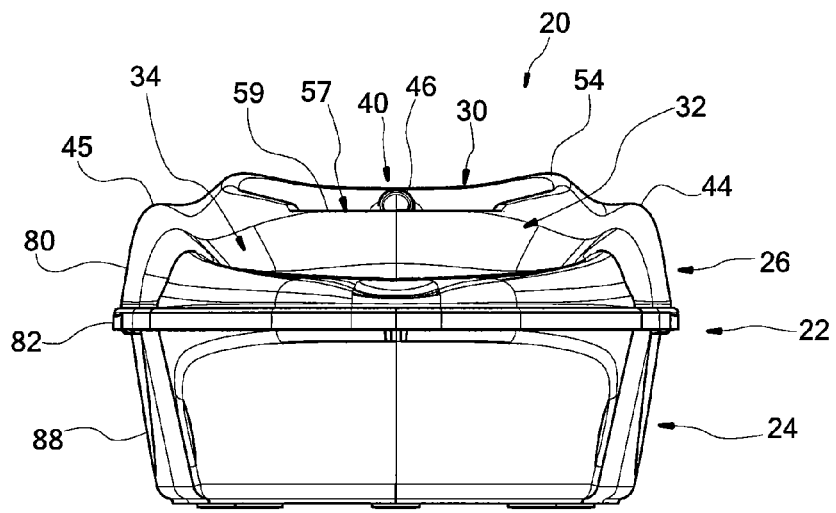
FIG. 4 is a front elevation view of the pet fountain shown in FIGS. 1-3.

The top edge 56 of the lower bowl 34 can be flush or substantially flush, e.g., of rimless construction, with an immediately adjacent surrounding portion of the outer surface 28 of the cover 26. As previously mentioned, lower bowl 34 further includes a drain 42 integrally formed into a lower bowl sidewall 58 that allows water in the bowl 34 to drop into the basin 36 integrally formed in the base 24. As is best shown in FIG. 2, the drain 42 preferably is an integrally formed oblong aperture 62 that extends completely through the lower bowl sidewall 58 that is defined by a top drain edge 64 that extends along a portion of the top edge 56 of the lower bowl 34 and a bottom drain edge 66 spaced below the top drain edge 64. The bottom drain edge 66 is generally horizontal or circumferentially extending within the lower bowl sidewall with it being spaced from generally circumferentially extending top edge 64 a sufficient distance so as to enable debris that has accumulated in the lower bowl 34 to be flushed through the drain 42 into return sump 98 where it can be filtered by filter 106. The height of the drain 42 from the bottom of the bowl 34 defines a maximum water level of the bowl 34. In a preferred embodiment, the drain 42 is disposed in the sidewall 58 adjacent to but below the bowl top edge 56. The size or surface area of the drain 42 is selected to enable the drain 42 to allow a flow rate of water to be drained from the lower bowl 34 that is at least as great as the maximum flow rate of water entering the upper bowl 30.

Referring now to FIGS. 3 and 5-7, the base 24 and cover 26 are configured with at least one releasable latch arrangement 68 that provides a snap-together housing and fountain construction that is quick and easy for a user to assemble, disassemble, fill, drain, and clean. The base 24 includes a pair of integrally formed upwardly extending tabs 70 for cooperating with a pair of detents 72 (FIG. 7) integrally formed in cover 26 to releasably secure base 24 and cover 26 to one another. However, if desired, the cover 26 can be configured with the tabs 70 and the base 24 can be configured with the detents 72. Tabs 70 and detents 72 are preferably provided on opposite lateral sides of base 24 and cover 26 respectively. As is best shown in FIGS. 5 and 6, each tab 70 is a resilient cantilever snap 74 with an outturned hook 76 at its free end and each detent 72 includes a projection 78 that releasably engages the snap hook 76 preventing cover removal. Base 24 includes an integrally formed recess 73 and cover 26 includes an outwardly extending integrally formed finger hold 75 that enables a finger of a user to engage the finger hold 75 to pull the projection 78 of at least one of the detents 72 free of its corresponding snap hook 76 to release at least one of the latch arrangements 68 thereby enabling the cover 26 to be removed from the base 24.

Referring to FIG. 8, mating surfaces of the base 24 and cover 26 are configured to provide a locational clearance fit between the base 24 and cover 26 when they are assembled to one another. These mating surfaces preferably extend substantially around the entire periphery of the base 24 and cover 26. These mating surfaces include an outwardly offset skirt or lip 82 that extends outwardly from an outer sidewall 80 of the cover 26 having a downwardly facing bottom edge that defines a downwardly facing seat 84. These mating surfaces also include a top edge 86 of an upwardly extending sidewall 88 of the base 24 upon which the seat 84 can abut when the cover 26 is assembled to the base 24. When assembled, abutment between the seat 84 of the cover 26 and the base sidewall top edge 86 locates the cover 26 on the base 24 preventing relative vertical movement therebetween. When assembled, cooperation between the lip 82 and base sidewall 88 prevents relative lateral movement between the cover 26 and base 24 thereby further locating the cover 26 relative to the base 24.

As is also shown in FIG. 7, the base 24 can also have an outwardly extending flange 81 below its sidewall top edge 86 that can also help locate the cover 26 relative to the base 24 when the cover 26 is assembled to the base 24. If desired, the lip 82 can have an inner complementary recess 83 formed therein in which at least part of flange 81 can be received.

When the cover 26 is placed on the base 24, the tab 70 of each latch arrangement 68 releasably engages a corresponding detent 72 thereby releasably but positively attaching the cover 26 to the base 24. As the cover 26 is being placed on the base 24, the outwardly offset lip 82 locates the cover 26 relative to the base 24 positioning the seat 84 on top of the top edge 86 of the base sidewall 88 aligning the cover 26 on the base 24. When the cover 26 is attached to the base 24, the cover 26 completely covers the basin 36 preventing debris and other matter from entering the basin 36. The pump 38 and filter 106 are also advantageously enclosed within the housing 22 such that the the pump 38 and filter 106 are protected by the housing 22.

Referring now to FIGS. 6, 7 and 9, tubular spout 46 is shown inserted into hole 48 formed in the outer surface 28 of the cover 26 that cooperates with a coupling tube 90 integrally formed in an underside 92 of the cover 26 extending outwardly therefrom. Spout 46 has a curved discharge opening 96 that directs the stream 37 of water discharged therefrom into upper bowl 30. Spout 46 includes an outwardly extending key 97 that is received in a complementary slot 99 in hole 48 to orient the discharge opening 96 toward the spillway 32.

Spout 46 preferably is an elongate curved tube having an inner diameter at its intake end that is smaller than the inner diameter of its discharge opening 96. Outer diameter is similarly tapered from being larger at the discharge opening 96 than the intake end opposite the discharge opening. Such an arrangement not only facilitates assembly but flow through the spout 46 during operation using a relatively high flow rate pump 38, such as a submersible aquarium pump or the like. Spout 46 is also replaceable enabling a worn spout or dirty spout to be removed and replaced.

Coupling tube 90 is used to fluidly couple the spout 46 with the pump 38 in a manner that also advantageously helps locate and anchor the pump 38 during use and assembly when the cover 26 is attached to the base 24. A pump locator tube 94 extends outwardly from the coupling tube 90. The pump locator tube 94 telescopically couples with a discharge port 120 of the pump 38. An end 95 of the pump locator tube 94 is outwardly beveled so as to facilitate guidance of the discharge port 120 of the pump 38 during attachment of the cover 26 to the base 24.

In one preferred embodiment, the discharge spout 46 is fixed in hole 48 and the pump locator tube 94 is fixed in coupling tube 90. If desired, the discharge spout 46 and coupling tube 90 can be formed as a unit, such as being of one-piece, unitary and homogenous construction. If desired, coupling tube 90 can be extended in length so as to directly couple with the pump discharge port 120 eliminating the need for pump locator tube 94.

The base 24 is configured to hold a supply of water in its basin 34 for use in pet fountain 20 according to the present invention. The basin 34 includes a return sump 98 and a pumping chamber 100 separated from one another by an integrally formed divider 102 that includes an integrally formed filter holding arrangement 104 that holds at least one removable filter 106. When the cover 26 is mounted on the base 24, return sump 98 is positioned beneath drain 42 for receiving water from the lower basin 34 flowing out the drain 42. The front portion of the sidewall 88 of the base 24 has a curved chute 108 against which water flowing down from the drain 42 impinges, advantageously propelling the water toward the pumping chamber 100. Chute 108 is integrally formed of base sidewall 88.

Divider 102 includes a pair of laterally extending opposed divider walls 110, 112 that each extends inwardly from a corresponding side of base sidewall 88. Each divider wall 110, 112 has a vertically extending filter-holding channel 114 integrally formed in its free end. Filter 106 includes an outer frame 116 that holds filter media 118 that can be or include a layer or the like of charcoal filter media, e.g. activated charcoal filter media. Filter 106 is of generally planar construction with it being slidably inserted into the filter-holding channels 114 of both divider walls 110, 112 such that it is removably received therein enabling quick and easy replacement.

The pump 38 is received in pumping chamber 100. Pump 38 includes an intake 119 (FIG. 9) in its side or bottom and a discharge port 120 that extends outwardly from its top. The intake 119 of the pump 38 is configured to draw water from within the pumping chamber 100 that has passed from the return sump 98 through filter 106 such that the water in pumping chamber 100 is filtered prior to being pumped into the upper bowl 30. Where the filter 106 is equipped with a purifying filter media, such as activated charcoal or the like, the water is both filtered and at least somewhat purified as it passes through the filter 106.

Discharge port 120 is configured for pumping the water in pumping chamber 100 into tube 94 which conveys it to spout 56 from which it is discharged into the upper bowl 30. Pump 38 is preferably a variable flow pump that has a movable lever 121 or other such mechanism for enabling manual adjustment of its flow rate. In a preferred embodiment, pump 38 is a submersible pump, such as a submersible aquarium pump or the like. An example of a suitable type of pump 38 is a magnetic impeller pump that preferably is of submersible construction. Pump 38 is located relative to an inlet 95 of tube 94 by an upraised pump seat 124 that is integrally formed in a bottom wall 126 of the base 24 to ensure registry when the cover 26 is attached to the base 24.

The pump seat 124 is formed by four upraised generally L-shaped cradles 128, only two of which are shown in FIG. 5, arranged to receive a generally rectangular or square end of the pump 38 in a manner that locates its discharge port 120 is generally coaxially with tube inlet 95. The pump locator cradles 128 bracket all four corners of the pump 38 in a manner that locates the pump 38 while also preventing the pump 38 from moving away from its desired location when seated in the cradles 128.

With reference to FIGS. 7 and 9, when the cover 26 is attached to the base 24, the discharge port 120 of the seated pump 38 is telescopically received in the inlet 95 of the locator tube 94. Since the locator tube 94 is rigidly attached to the cover 26 via coupling tube 90, attachment of the cover 26 to the base 24 helps secure (along with cradles 128 of seat 126) the seated pump 38 in its desired location within the pumping chamber 100.

In a method of assembly, the pump 38 is seated in the pump seat 124 with its bottom corners bracketed by the upraised cradles 128 of the seat 124. The pump 38 can have one or more suction cups 123 or the like on its bottom that facilitate at least temporary attachment to the bottom 126 of the base 24. If desired, the cradles 128 can be configured to engage part of the pump 38 during seating of the pump 38 in helping to keep the pump 38 in place at least temporarily until the cover 26 is attached to the base 24. Attachment of the cover 26 onto the base 24 also locates the inlet 95 of locator tube 94 so it telescopically receives the pump discharge port 120, in effect capturing the pump 38 in its desired location between the cover 26 and base 24. As a result, when the cover 26 is attached to the base 24, the pump 38 is securely captured and retained in place in its desired location, namely seat 124.

Referring again to FIGS. 5-10, pump 38 includes a power cord 130 that has a conventional electrical plug 131 (FIG. 5) for insertion into a standard electrical power outlet (not shown), e.g., wall outlet, that provides electrical power having a voltage of at least 110 volts AC (e.g., between 110 volts AC and 240 volts AC). Power cord 130 is preferably sealed to prevent shorting, electric shock, and damage due to water coming into contact therewith. Power cord 130 is attached to the pump 38 in a manner that also prevents shorts and electrical shocks when immersed in water in the pumping chamber 100. Power cord 130 extends from pump 38 through a cord conduit 134 extending vertically from a bottom or floor 126 of base 24 that preferably is integrally formed thereof.

Conduit 134 is of tubular construction, has a generally rectangular cross section, and is of a height sufficient to extend above a maximum water level in the pumping chamber 100.

Figure 10:
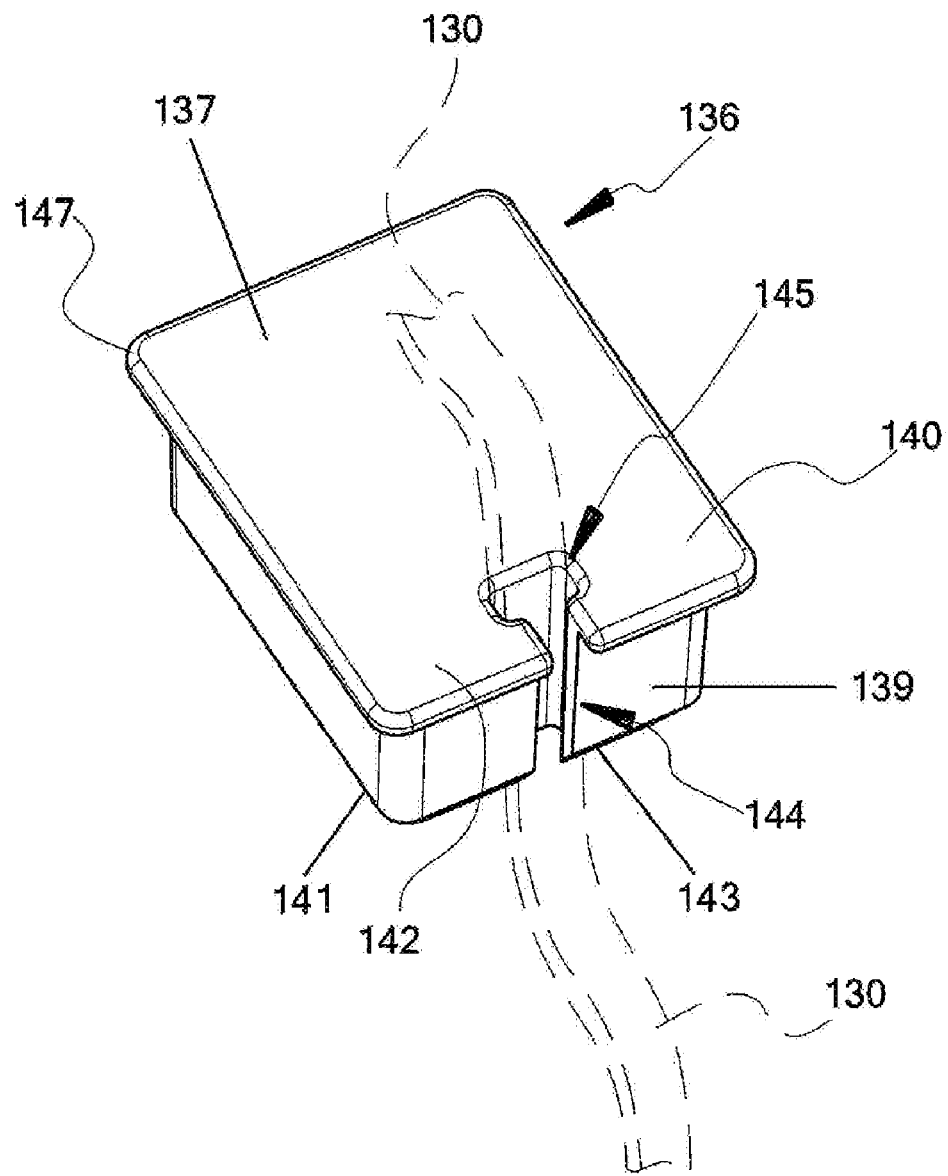
FIG. 10 is a perspective view of a sealing cap that also provides strain relief when assembled to the base.

Conduit 134 is sealed such that water is incapable of leaking therethrough by a sealing cap 136 that seals the conduit 134 while securing cord 130. With reference to FIG. 10, sealing cap 136 is of flexible and resilient construction and in a preferred embodiment is of elastomeric construction. In a preferred embodiment, cap 136 is a rubber or plastic seal configured to maintain a water-tight seal with respect to an upper opening 138 of conduit 134 that is disposed within the pumping chamber 100. The cap 136 has a top 137, a sidewall 139 depending from the top 137, and, as shown in FIG. 5, a bottom 141. Cap 136 includes a pair of flexible arms 140, 142 formed of part of the sidewall 139 that define a cord insertion slot 144 that communicates with a cord retainer channel 145 that enables part of cord 130 to pass through cap 136. The slot 144 and channel 145 extend through the top 137 of the cap 136 to a distal end 143 of the sidewall 139. As is shown in FIG. 5, the cord 130 is received in the channel 145 which extends to the bottom 141 of the cap 136. Slot 144 is about the width of the cord 130 at its narrowest extent and channel 145 is about the width of the cord 130 at its widest extent. Slot 144 can have a width that provides a force fit between the cap 136 and cord 130 when its narrowest extent is first inserted into slot 144 when attaching the cord 130 to the cap 136. Thereafter, channel 145 can have a width that also provides a force fit between cap 130 and cord 130 when it is rotated so its widest extent is inserted into the channel 145 after the cord 130 is manipulated through slot 144 during cord attachment.

When the sealing cap 136 is inserted into conduit opening 138, a force fit provided between the cap 136 and conduit 134 pinches the part of the cord 130 in channel 145 while also urging the arms 140, 142 together in a manner that provides a water tight seal. An outwardly extending flange 147 about its top periphery abuts a top edge 149 of the conduit 134 further facilitating a water tight seal.

In a preferred embodiment, the sealing cap 136 is configured to provide a force fit with the conduit 134 when inserted into the conduit opening 138, causing the cap 136 to compress in the region of the cord channel 145 causing the cap 136 to seal about the part of the cord 130 received in the channel 145. Insertion also causes arms 140, 142 to be urged together which further facilitates substantially water-tight clamping of the cord 130. Finally, depending on the configuration of the arms 140, 142 and their initial pre-insertion spacing from each other, insertion of the cap 136 into the conduit 134 can cause the arms 140, 142 to be urged sufficiently tightly together essentially closing slot 144 and providing a substantially water-tight seal therebetween.

The force fit between the cap 136 and conduit 134 also anchors the cap 136 in the conduit 134 in a manner that advantageously provides a cord strain relief to the clamped cord 130. Providing such a strain relief advantageously keeps the tension on that portion of the cord 130 that lies outside the fountain 20 from being transmitted to the part of the cord 130 within the fountain housing 22.

With continued reference to FIG. 5, the underside 146 of the bottom 126 of base 24 is shown. The bottom 141 of the seal cap 136 is shown received in cord conduit 134 with cord 130 received in an elongate cord channel 151 integrally formed in the bottom surface 146 of base bottom 126. The bottom surface 146 also includes a number of feet 148 around a perimeter thereof for preventing fountain 20 from sliding along the ground or other surface upon which the fountain 20 is placed. That is, feet 148 provide a frictional interface between the ground or other surface and base 24 such that pet fountain 20 is incapable of sliding along the surface preventing spilling of water. Feet 148 are preferably constructed from rubber, plastic or similar such material.

Cover 26 including upper bowl 30, lower bowl 34, spillway 32, drain 42, opening 48, tube 90, lip 82, seat 84 is of one-piece, unitary construction. In a preferred embodiment, the cover 26 is molded of plastic. Base 24, including divider wall segments 110, filter holders 114, cord conduit 134 and pump seat 124 is of one-piece, unitary construction. In a preferred embodiment, the base 24 is also molded of plastic.

Figure 11:
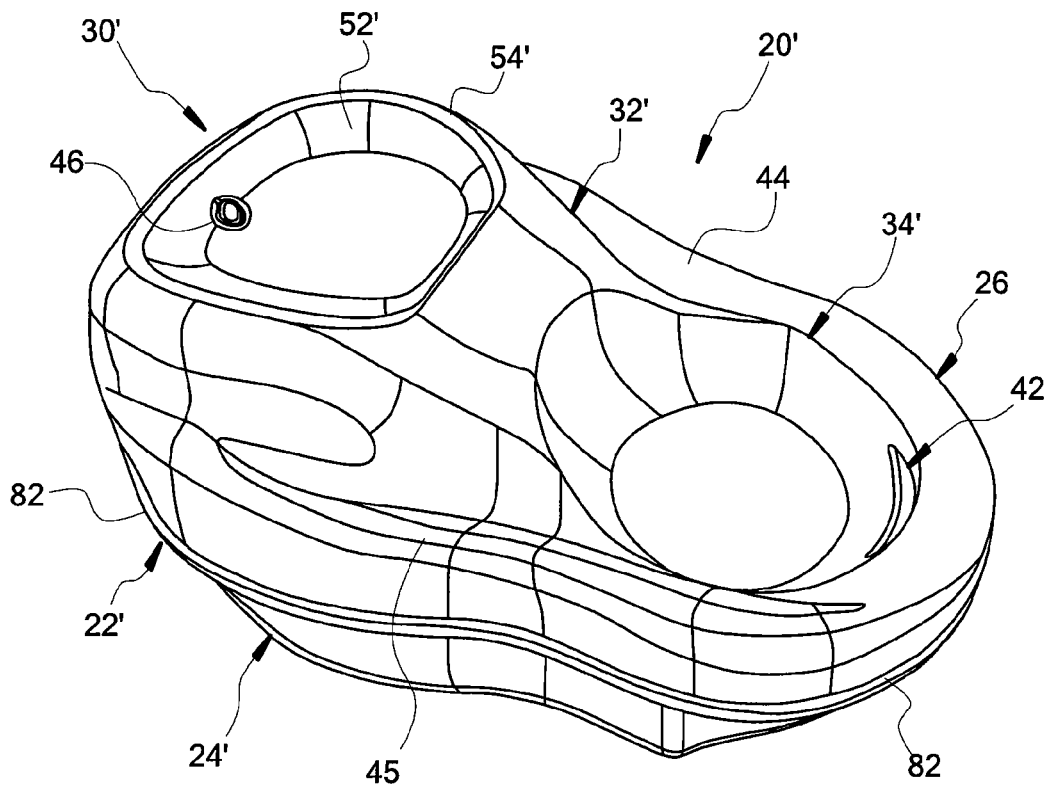
FIG. 11 is a top perspective view of a second and preferred embodiment of a pet fountain constructed in accordance with the present invention.
Figure 12:
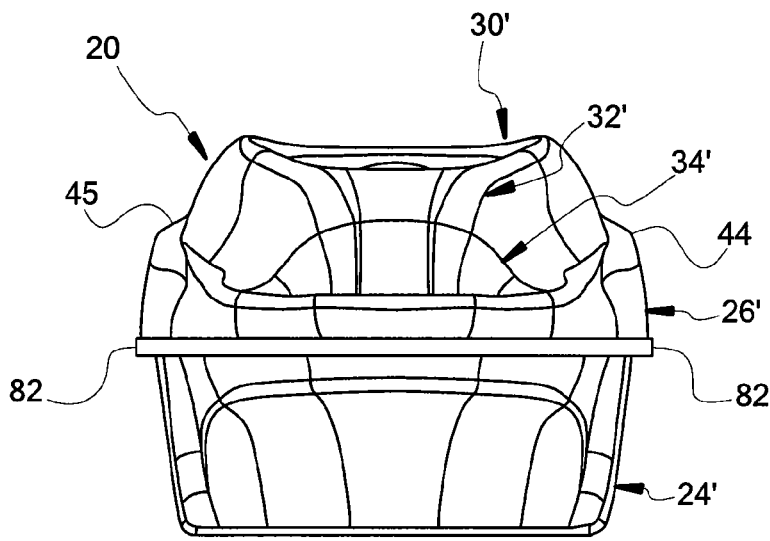
FIG. 12 is a front elevation view of the pet fountain of FIG. 12.
Figure 13:
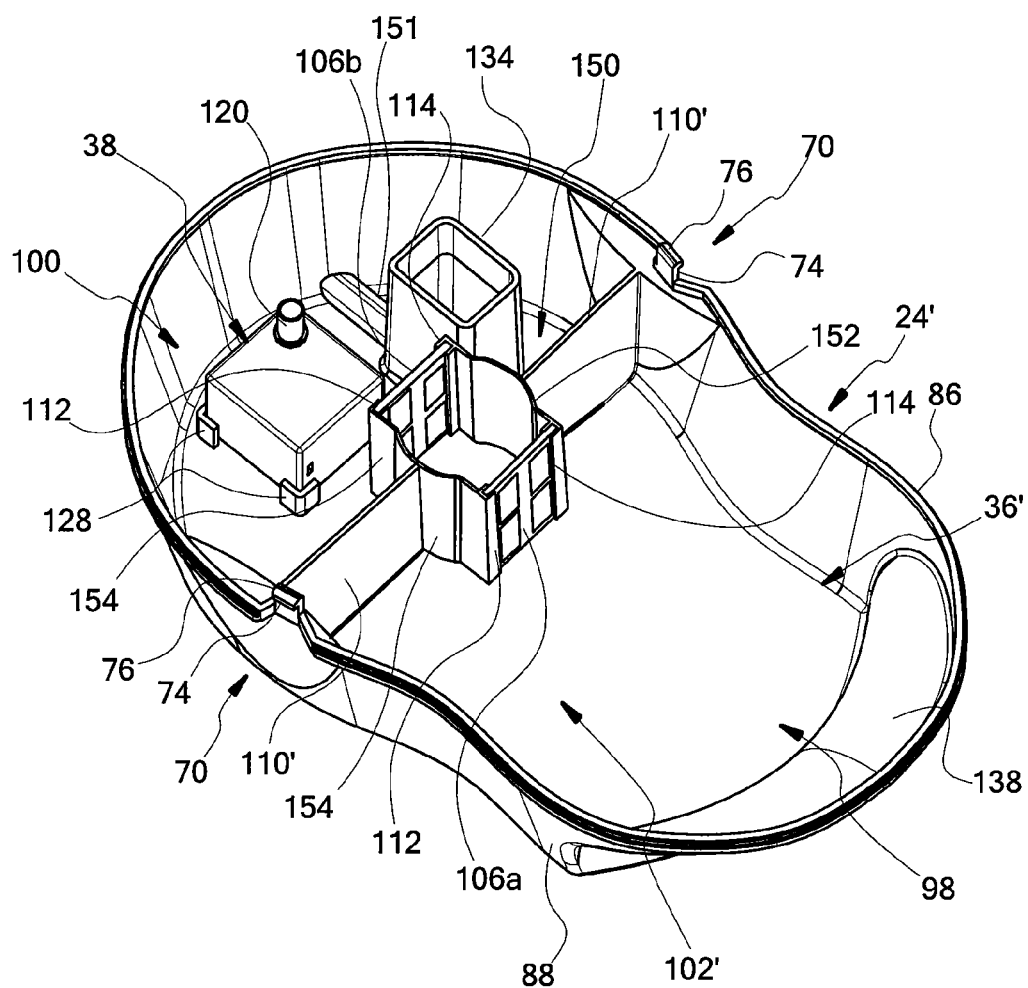
FIG. 13 is a top perspective view of the base of the pet fountain of FIG. 12.

FIGS. 11-13 illustrate another currently preferred embodiment of a pet fountain 20' that is of essentially the same construction as fountain 20 shown in FIGS. 1-10 with the exception of the differences discussed below. In the preferred fountain embodiment shown in FIGS. 1-10, the upper bowl 30' is configured without any interruption in its top edge 56 such that spillway 32' extends continuously between upper bowl 30' and lower bowl 34'. Where spillway 32' and top edge 56' converge can be generally straight as depicted in FIG. 11. Spillway 32' is smooth and convexly curved along its transverse direction as generally shown in FIGS. 11 and 12. Spillway 32' is also smooth in its longitudinal or lengthwise direction.

The upper bowl 30' is oriented and configured so that the end of the bowl 30' that borders spillway 32' is lowest so that water overflowing the bowl 30' freely flows from the bowl 30' onto the spillway 32'. As with the fountain embodiment shown in FIGS. 1-10, water flows down the spillway 32' into the lower bowl 34. In the preferred fountain embodiment shown in FIGS. 11-13, the upper bowl 30' is integrally formed in the cover 26' in a manner that lacks any break in the basin top edge 54'.

FIG. 13 illustrates a preferred embodiment of a base 30' that is similar to base 30 shown in FIGS. 1-10 but which has a divider 102' configured with an integrally formed filter chamber 150 that holds a plurality of filters 106a and 106b. Each divider wall section 110' terminates in a generally perpendicularly extending filter chamber wall 152, 154 that each has a pair of filter-receiving channels 112, 114 integrally formed at their respective ends. First filter 106a can be a pre-filter or first stage filter with filter media that lacks any purifying capability. Second filter 106b is a second-stage filter that can provide purifying capability such as by including activated charcoal or the like.

The upstream filter 106a provides a pre-filter or first stage of filtration of water being drawn from the return sump 98 toward the pumping chamber 100. The downstream filter 106b provides a second stage of filtration that filters the water before it is drawn into the pumping chamber 100 and expelled by the pump 38 into the upper bowl 30'. In one implementation, the first stage filter 106a has a filter media that lacks any purifying filter media and the second stage filter 106b includes a purifying filter media, such as activated charcoal or the like. If desired, the first stage filter 106a can include purifying filter media.

In assembly, pump 38 is placed in seat 124 with its discharge port 120 facing upwardly toward the center of the base 24 and with its cord 130 extending through cord conduit 134. Part of cord 130 is manipulated through slot 144 in cap 136 until it is disposed in channel 145. Cap 136 is then inserted into the opening of conduit 134 until its outwardly extending flange 147 abuts the top edge 149 of the conduit 134. Filter 106 is inserted into filter holding channels 114 forming divider 102 with divider wall segments 110. Where two filters 106a and 106b are used, both filters 106a and 106b are inserted into their respective filter holder channels 112, 114 of filter chamber 150.

Thereafter, cover 26 is manipulated over base 24 until its seat 84 overlies top edge 86 of the base sidewall 88. Cover 26 is brought toward base 24 until releasable latch arrangements 68 releasably engage the cover 26 to the base 24. As the cover 26 is being attached to the base 24, locator tube 94 coaxially registers with the pump discharge port 120 ensuring proper fluid flow to the upper bowl 30 while also helping to capture the pump 38 in place in its seat 124. Cover 26 can have discharge spout 46 inserted into hole 48 in upper bowl 30 before or after attachment of cover 26 to base 24. Tube 94 is inserted into tube 90 before the cover 26 is attached to base 24.

In operation, pet fountain 20 continually recirculates water 31 for drinking by a pet, such as a cat or dog. In preparation for operation of pet fountain 20, a user removes cover 26 from base 24 and fills basin 36 with water to a height below that of the top of the conduit 134. Once filled with water, the cover 26 is snapped onto the base 24 and the pet fountain 20 is positioned at ground level or other such location for easy access by the pet. Pet fountain 20 is then powered by inserting the prongs of the plug 131 located distal end of power cord 130 into a wall outlet (not shown). Once electrical power is supplied to pump 38, water in the pumping chamber 100 is drawn in through the pump intake 119 and expelled out its discharge port 120. As previously discussed, discharge port 120 is positioned in fluid-flow communication with discharge spout 46 when the cover 26 is attached to the base 24 such that water from the pump 38 is expelled out the spout 46 into the upper bowl 30 or 30'. The sight and/or sound of the flow of water being expelled from spout 24 into upper bowl 30 or 30' entice the pet to drink from pet fountain 20.

As water flows into upper bowl 30 or 30', it fills up the bowl 30 or 30' until it overflows onto spillway 32 or 32'. Water flows down spillway 32 or 32' into the lower bowl 34 or 34'.

Water flowing into the lower bowl 34 or 34' fills the lower basin 34 or 34' until it reaches the bottom edge 66 of the drain 42. Once the water level of lower bowl 34 or 34' reaches the height of drain 42, the water and any debris, hair or the like in the lower bowl flows through drain 42 and falls downwardly into the return sump 98 in the base 24. Gravity causes water flowing through the drain 42 to fall onto curved chute 108 where it is propelled by its force of impact, the shape of chute 108, and gravity toward the filter 106 and the pumping chamber 100. As the pump 38 operates, it pulls the water in the return sump 98 through the filter 106 (or filters 106a and 106b) into the pumping chamber 100. After passing through the filter 106 (or filters 106a and 106b) and entering the pumping chamber 100 the water is once again drawn into the intake 119 of the pump 38 and discharged out spout 46 into upper bowl 30 or 30' continuously recirculating the water in a manner that keeps the water fresh and debris free.

As a result of the pump 38 pulling water through the filter 106 (or filters 106a and 106b) pumping losses are reduce and filtering life and efficiency is increased. Pumping losses are decreased because the pump 38 does not have to push water through the filter. Pump life is increased and flow rate maximized as plugging of the pump 38 is minimized and preferably prevented because only filtered water enters the pump.

As water passes through the filter 106 or filters 106a and 106b, pet hair, particulate matter, and other debris are filtered. Where a filter includes a purifying media, such as activated charcoal, water is also purified to at least some degree as it passes through the filter. Where it is desired to change the rate water recirculates, the cover 26 can be removed and the user can change the pump flow rate by adjusting or otherwise moving flow control lever 121 of the pump 38.

When it is desired to change the filter 106 or filters 106a, 106b, the cover 26 is unsnapped from the base 24 exposing the filter(s). The spent filter is grasped and removed from the filter channels 112, 114 of the divider wall 110 or of pumping chamber 150 and a new filter is inserted in its place. The pump 38 can be checked to make sure it is seated before the cover 26 is snapped onto the base 24. As previously discussed, when the cover 26 is snapped onto the base 24, locator tube 94 coaxially registers with the pump discharge port 120 thereby helping to locate the pump 38 and helping to capture the pump 38 in its seat 124. This procedure can also be used when it is desired to fill or refill the basin 36 with water. As a result, disassembly to perform maintenance and/or filling, the performance of the maintenance and/or filling, as well as assembly following maintenance and/or filling is advantageously quick and easy, even for a novice.

If desired, a reservoir (not shown), such as a reservoir of releasable or removable construction, may be provided for use with pet fountain 20. Such a reservoir may be provided to allow a user to add water without interrupting operation of pet fountain 20. Such a reservoir may be configured to be easily removed by the user and filled with water before reattaching to pet fountain 20. Such a reservoir can be a container, such as a bottle, or another arrangement for providing or holding water. Once attached to pet fountain 20, water is allowed to drain from the reservoir into basin 36 or one of the bowls 30, 34 to provide pet fountain 20 with additional water to compensate for water drank by the pet or evaporated during operation of pet fountain 20.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A pet fountain comprising:
   a fountain base that provides a water-holding basin and includes a cord conduit having a conduit opening and extending from within the basin to outside the basin;
   a cover carried by the base, the cover overlying the cord conduit;
   a pump in fluid flow communication with the cover, the pump delivering water from the basin to the cover during pump operation, the pump having an elongate electrical power cord extending from the pump through the cord conduit; and
   a cord conduit cap telescopically received in the cord conduit, the cord conduit cap engaged with the cord conduit and having a top, a sidewall depending from the top, and a cord-receiving recess formed by the sidewall, the cord-receiving recess extending completely through the top to a distal end of the sidewall, the cord receiving recess receiving part of the electrical power cord therein with the electrical power cord extending completely through the cord conduit cap when the cord conduit cap is telescopically received in the cord conduit.

2. The pet fountain of claim 1 wherein the cap has a portion received in the cord conduit and a flange extending outwardly from the cap adjoining part of the cord conduit when the portion of the cap is received in the cord conduit.

3. The pet fountain of claim 1 wherein the cord-receiving recess formed in the cap has a generally T-shaped cross section comprised of a cord insertion slot in communication with an elongate cord retainer channel in which the part of the electrical power cord received in the cord-receiving recess is retained.

4. The pet fountain of claim 1 wherein the cap comprises a pair of spaced apart arms defining the cord-receiving recess with each arm elongated in a lengthwise direction of the cap and wherein the pair of spaced apart arms engage the part of the electrical power cord received in the cord-receiving recess, the spaced apart arms retaining the part of the cord received in the cord-receiving recess between the pair of spaced apart arms.

5. The pet fountain of claim 4 wherein the arms are flexible and clamp the part of the electrical power cord received in the cord-receiving recess therebetween providing cord strain relief.

6. The pet fountain of claim 1 wherein the electrical power cord carries at least 110 volts alternating current and extends through the cord conduit to an electrical plug disposed outside the base with the plug attached to a free end of the electrical power cord.

7. The pet fountain of claim 1 wherein a force fit is provided between the part of the electrical power cord received in the cord-receiving recess and the cap, the cap retaining the electrical power cord in the cord-receiving recess via the force fit.

8. The pet fountain of claim 1 wherein a force fit is provided between the cap and the cord conduit by engagement between the cap and the cord conduit.

9. The pet fountain of claim 1 wherein the cord-receiving recess formed in the cap extends the entire length of sidewall of the cap, the cord-receiving recess positioning the part of the electrical power cord received in the cord-receiving recess inside and alongside the cord conduit when the cap is engaged with the cord conduit.

10. The pet fountain of claim 9 wherein the cap has a flange extending generally outwardly about the periphery of the cap with the flange interrupted by the cord-receiving recess.

11. The pet fountain of claim 10 wherein the cap comprises a cord strain relief.

12. The pet fountain of claim 11 wherein a force fit is provided between the cap and the electrical power cord retaining the electrical power cord in the cord-receiving recess.

13. The pet fountain of claim 12 wherein a force fit is provided between the cap and the cord conduit and the cord-receiving recess comprises a generally T-shaped channel.

14. The pet fountain of claim 13 wherein the electrical power cord carries at least 110 volts alternating current.

15. The pet fountain of claim 1 wherein (a) the cord conduit (1) is tubular, (2) extends generally outwardly from the basin, and (3) has a generally rectangular opening, and (b) the cap is generally rectangular with the sidewall having first and second pairs of generally parallel sides and a flange extending outwardly from the sides of the cap about the periphery of the cap with the flange interrupted by the cord-receiving recess.

16. The pet fountain of claim 15 wherein the cord-receiving recess comprises a generally T-shaped channel that is elongate in a lengthwise direction of the cap extending the entire length of one of the sides of the cap, the cord-receiving recess positioning the part of the electrical power cord received in the generally T-shaped channel alongside and within the cord conduit when the cap is engaged with the cord conduit.

17. The pet fountain of claim 16 wherein the sides of the cap are received in the cord conduit when the cap is engaged with the cord conduit.

18. The pet fountain of claim 17 wherein the flange abuts a portion of the cord conduit adjacent the opening of the cord conduit when the sides of the cap are received in the cord conduit.

19. The pet fountain of claim 9 wherein the fountain base has a bottom wall from which a sidewall extends defining the basin, wherein the tubular cord conduit is disposed in the basin and extends upwardly, wherein the cover overlies the pump and the cord conduit with the cover removably attached to the fountain base by snap fit engagement therebetween and having a drinking bowl formed therein, and wherein the pump is a submersible pump disposed in the basin alongside the cord conduit with the pump in fluid-flow communication with the drinking bowl.

20. The pet fountain of claim 19 wherein the fountain base has a pair of spaced apart and generally aligned filter-holding channels disposed upstream of the pump that are configured to receive a generally planar filter, the filter-holding channels disposing the generally planar filter upstream of the pump so the generally planar filter filters water in the basin before the water is delivered by the pump from the basin to the drinking bowl, and further comprising a generally planar filter received in the filter-holding channels.

21. A pet fountain comprising:
a fountain base that provides a water-holding basin and includes a tubular cord conduit having a generally rectangular opening;
a cover carried by the base that overlies the cord conduit and has a drinking bowl formed therein;
a pump underlying the cover that is in fluid flow communication with the drinking bowl, the pump delivering water from the basin to the drinking bowl during pump operation, the pump having an elongate electrical power cord extending from the pump into the cord conduit; and
a generally rectangular cord conduit cap received in the generally rectangular opening in the cord conduit, the cap having a top facing generally upwardly, a bottom, disposed in the conduit facing generally downwardly, and a sidewall depending from the top having an elongate generally T-shaped cord-receiving channel formed in the sidewall in which part of the electrical power cord is received and engaged by the cap providing cord strain relief to the electrical power cord; and
wherein the generally T-shaped cord-receiving channel is elongated in a lengthwise direction of the cap with the generally T-shaped cord-receiving channel extending the length of the cap from the top of the cap to the bottom of the cap.

22. The pet fountain of claim 21 wherein the cap has a portion received in the cord conduit and a flange extending outwardly from the cap that abuts part of the cord conduit when the portion of the cap is received in the cord conduit.

23. The pet fountain of claim 21 wherein the sidewall of the cap comprises a pair of spaced apart arms defining the generally T-shaped cord-receiving channel therebetween and wherein the cord strain relief is provided by engagement between the arms and the part of the electrical power cord received in the T-shaped cord-receiving channel.

24. A pet fountain comprising:
a fountain base that provides a water-holding basin and includes a tubular cord conduit having a generally rectangular opening;
a cover removably attached to the base by snap fit engagement therebetween, the cover overlying the cord conduit and having a drinking bowl formed therein;
a submersible pump disposed in the basin underlying the cover that is in fluid flow communication with the drinking bowl, the pump delivering water from the basin to the drinking bowl during pump operation, the pump having an elongate electrical power cord extending from the pump into the cord conduit; and
a generally rectangular cord conduit cap inserted into the cord conduit having a top, a flange extending outwardly about the periphery of the cap that abuts a portion of the cord conduit when inserted into the cord conduit, and a sidewall having a generally T-shaped cord-receiving channel formed therein in which part of the electrical power cord extending into the cord conduit is received with the generally T-shaped cord-receiving channel extending substantially completely through the cap from an end of the sidewall adjacent the top to a distal end of the sidewall.

25. The pet fountain of claim 24 wherein the electrical power cord carries at least 110 volts alternating current and extends through the cord conduit to an electrical plug disposed outside the base attached to the free end of the electrical power cord.

26. A pet fountain comprising:
a fountain base having a bottom wall and a sidewall defining a water-holding basin that includes an upwardly extending tubular cord conduit disposed in the basin having an opening;
a cover removably attached to the base by snap fit engagement therebetween, the cover overlying the cord conduit and having a drinking bowl formed therein;
a submersible pump in the basin underlying the cover that is in fluid flow communication with the drinking bowl, the pump delivering water from the basin to the drinking bowl during pump operation, the pump having an elongate electrical power cord carrying at least 110 volts alternating current extending from the pump through the cord conduit to an electrical plug outside the base; and
a cord conduit cap inserted into the opening in the cord conduit, the cap comprising (a) a top, (b) a flange extending outwardly about the periphery of the cap that adjoins a portion of the cord conduit when the cap is inserted into the cord conduit, (c) a sidewall depending from the top, and (d) a cord-receiving recess formed in the sidewall extending from the top to a distal end of the sidewall, the cord-receiving recess receiving part of the electrical power cord extending into the cord conduit and positioning the part of the electrical power cord received in the cord-receiving recess alongside and within the cord conduit when the cap is inserted into the cord conduit.

27. The pet fountain of claim 26 wherein the cap has a pair of spaced apart arms that define the cord-receiving recess.

28. A pet fountain comprising:
a fountain base having (a) a bottom wall and a sidewall defining a water-holding basin, (b) an upwardly extending tubular cord conduit having a cord conduit opening, and (c) a pair of spaced apart filter-holding channels;
a cover removably attached to the base by snap fit engagement therebetween, the cover overlying the cord conduit and having a drinking bowl formed therein;
a submersible pump in the water-holding basin underlying the cover, the pump in fluid flow communication with the drinking bowl, the pump delivering water from the basin to the drinking bowl during pump operation, the pump having an elongate electrical power cord extending outwardly therefrom through the cord conduit to outside the base;
a cord conduit cap comprised of an elastomeric material that is received in the opening in the cord conduit having force fit engagement therebetween, the cap having a top, a bottom, and a sidewall depending downwardly from the top that comprises a pair of arms spaced apart defining a generally T-shaped cord-receiving recess comprising a cord insertion slot in communication with an elongate cord retainer channel in which part of the electrical power cord extending into the cord conduit is received and retained, the cap comprising a cord strain relief, and the generally T-shaped cord-receiving recess elongated in a lengthwise direction of the cap extending the length of the cap from the top of the cap that faces generally upwardly when the cap is received in the cord conduit to a distal end of the sidewall adjacent the bottom of the cap that faces generally downwardly when the cap is received in the cord conduit and that is disposed in the cord conduit when the cap is received in the cord conduit; and a filter disposed alongside the pump in the water holding basin so that water in the basin is filtered before the water is delivered by the pump from the basin to the drinking bowl, the filter removably received in the pair of spaced apart filter-holding channels.

* * * * *